No. 750,929. PATENTED FEB. 2, 1904.
F. H. WORKS.
SIDEWALK OR OTHER LIGHT.
APPLICATION FILED MAY 1, 1901.
NO MODEL.
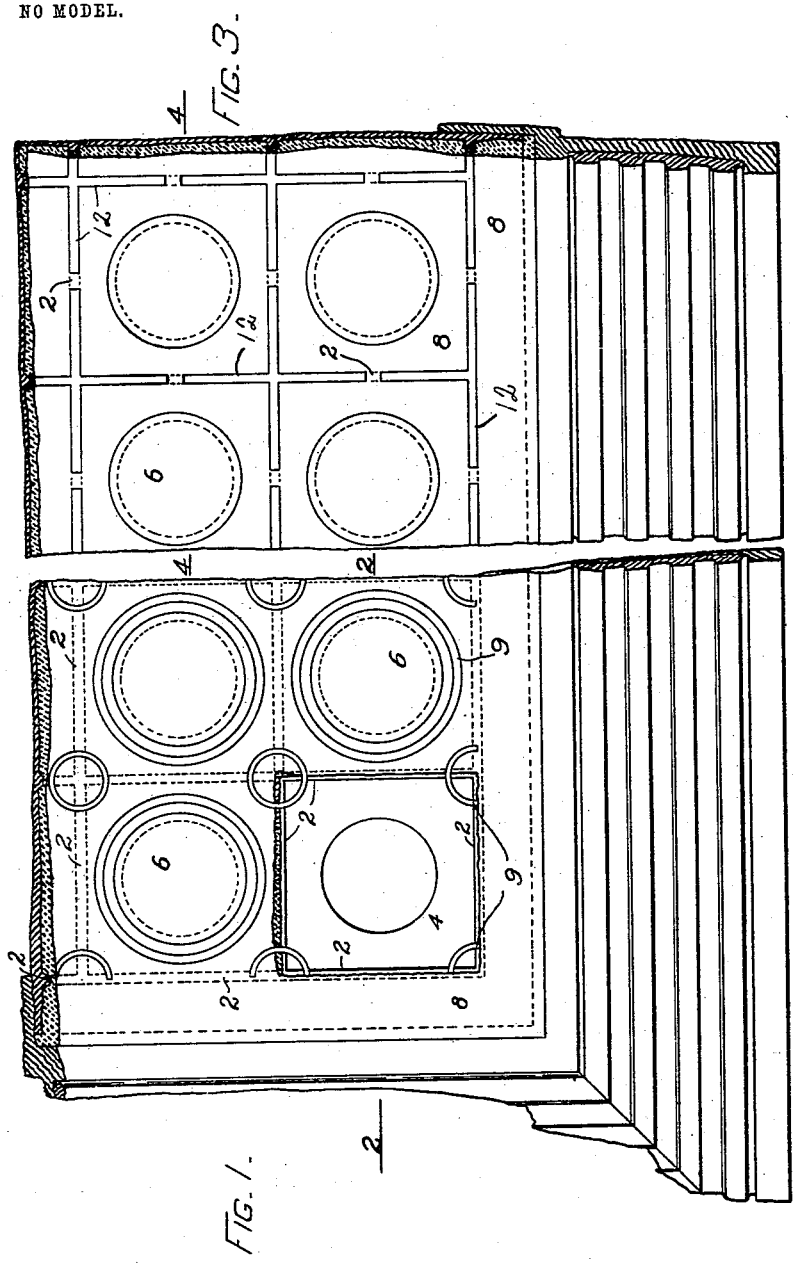
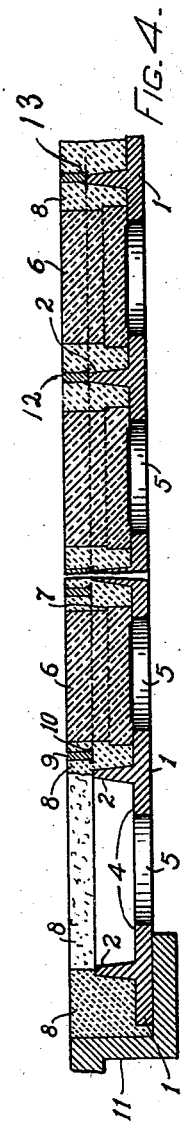
WITNESSES
E. A. Allen.
M. E. Coveney
INVENTOR
Frank H. Works,
by his attorney,
Edmd S. Beach No. 750,929. Patented February 2, 1904.

UNITED STATES PATENT OFFICE.

FRANK H. WORKS, OF BOSTON, MASSACHUSETTS, ASSIGNOR TO THE UNIVERSAL SAFETY TREAD COMPANY, OF JERSEY CITY, NEW JERSEY, A CORPORATION OF NEW JERSEY.

SIDEWALK OR OTHER LIGHT.

SPECIFICATION forming part of Letters Patent No. 750,929, dated February 2, 1904.

Application filed May 1, 1901. Serial No. 58,310. (No model.)

*To all whom it may concern:*

Be it known that I, FRANK H. WORKS, a citizen of the United States, residing at Boston, in the county of Suffolk and State of Massachusetts, have invented certain new and useful Improvements in Sidewalk or other Lights, of which the following is a specification, reference being had therein to the accompanying drawings.

Figure 1 is a top plan view of a portion of a "sidewalk-light," so-called, contained in my invention, the hard-metal supporting-frame thereof being broken away in part for greater clearness and one light being removed to show the construction of the supporting-frame. Fig. 2 is a sectional view at line 2 2 of Fig. 1. Fig. 3 shows a modification in plan view; Fig. 4, a section on line 4 4 of Fig. 3.

The object of my invention is to produce a so-called "sidewalk-light" in which the glass plugs or lights are secured in place by cement, which also holds non-slipping material—such as lead, for example—so that it would not be accidentally displaced from the cement, the non-slipping material, lights, and cement forming the tread-surfaces of the completed structure.

In the drawings, 1 is a base-plate, of cast-iron, for example. The upper side of base-plate 1 is provided with upwardly-extending integral walls 2, which may be of any desired shape or configuration. In this instance the raised walls 2 form rectangular spaces therein between, and through the bottom portions 4 of the base-plate suitably-shaped openings 5 are formed. The openings 5 are smaller than the bottom walls of the inclosure within the upwardly-projecting walls 2, so as to form light-supporting ledges around the openings 5. In the drawings these ledges are identical with the bottom portions 4.

Lights 6 may be of any desired shape and are made smaller at the top than at the bottom, so that they will be anchored in place by the cement when it is set. To this end these lights are conveniently formed with a projecting shoulder 7 betweeen their upper and under sides. Lights 6 are smaller than said inclosures and larger than said openings and are mounted with their under sides resting on the ledges, which form the bottom 4 of said inclosures around the opening 5. Lights 6 are arranged over the openings 5. The lights 6 being thus mounted, cement 8 is filled in between the side walls of the inclosure—that is to say, between the walls 2 and the outer edges of the lights 6—the cement resting on the shoulder 7, so as to prevent the lights from being moved upward after the cement is set. Before the cement is set and when it is first inserted I mount therein plugs, of non-slipping material—such as lead, for example. The plugs may be of any desired shape, but are herein shown as rings which are flared at their under ends 10, so that when the cement within and around them is set the rings will be locked with the cement, and so held tightly and permanently in place. The upper ends of the lead rings 9 are left flush with the upper surfaces of the cement and lights, which are also flush one with the other on the upper surface of the structure, so that its upper or tread surface presents alternating glass, lead, and cement wear-surfaces.

The foregoing is a very strong and economical construction, and its advantages are strength, economy of manufacture, economy of installation, and the non-slipping characteristics due to the exposure of the non-slipping rings or plugs or any desired shape on the upper or tread surfaces of the cement between the lights. By making the lights and plugs larger at their inner ends than they are at their upper ends they are interlocked with the cement in the completed structure. This interlocking may of course be obtained in various other ways readily known to makers of the structures.

The base-frame 1, with its contained lights, non-slipping plugs, and cement, is supported in practice in a suitable metal frame 11, too well known to require further description.

Figs. 3 and 4 show a modification. Herein the non-slipping plugs are in strip form 12 and are arranged at right angles one to the other and are exposed on the tread-surface of the structure and have their inner edges flared at 13 and are supported on the upper edges of the walls 2. The non-slipping strips are so made as to form rectangular non-slipping surfaces on the tread-surface of the cement, the said lights being severally inclosed within the rectangles or non-slipping material.

What I claim is—

In a sidewalk light, or analogous structure the combination of a base-plate having upwardly-projecting integral walls; openings through the base-plate between said walls, and smaller in size than the spaces inclosed by said walls; light-supporting ledges around said openings; lights mounted in said openings on said ledges; the lights being severally formed with projecting shoulders above which the lights are smaller than they are below the shoulders; cement set between said walls and lights, and engaging said shoulders and surrounding the lateral surfaces of said lights; plugs of non-slipping material set in said cement between the lights; the outer surfaces of said lights, non-slipping plugs and cement forming the tread-surface of the structure; and the non-slipping plugs being interlocked with said cement, pieces of non-slipping material mounted in said cement and supported by the intersecting portions of said upwardly-projecting walls, the outer surfaces of the non-slipping material being exposed.

In testimony whereof I affix my signature in presence of two witnesses.

FRANK H. WORKS.

Witnesses:
EDWARD S. BEACH,
E. A. ALLEN.